(No Model.)
G. H. HATHAWAY.
AUTOMATIC FERTILIZER DISTRIBUTER.
No. 441,554. Patented Nov. 25, 1890.
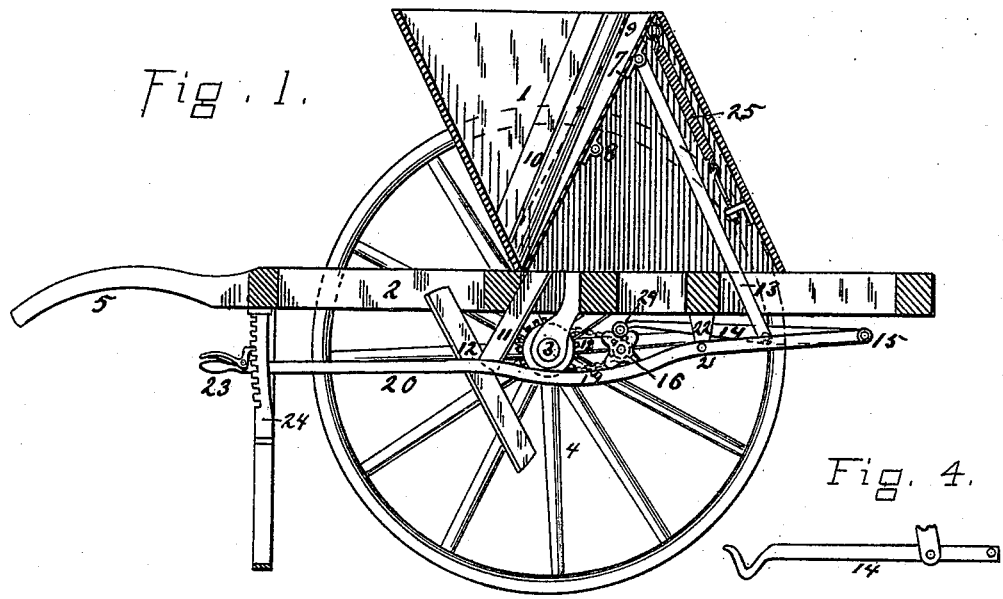
Fig. 1.
Fig. 4.
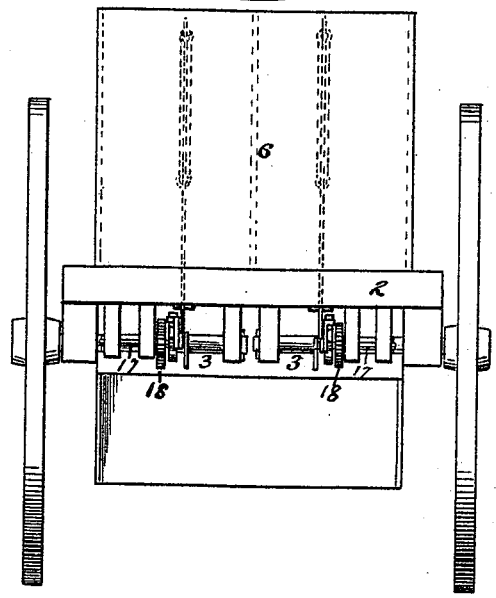
Fig. 2.
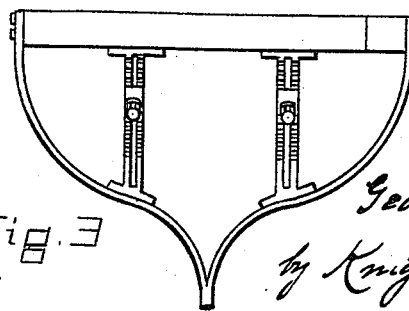
Fig. 3.
Attest:
Lillie Hanna
Mazie V. Bidgood
Inventor:
Geo. H. Hathaway
by Knight Bros
Attys
THE NORRIS PETERS CO., PHOTO-LITHO., WASHINGTON, D. C.

UNITED STATES PATENT OFFICE.

GEORGE H. HATHAWAY, OF BOSTON, ASSIGNOR OF ONE-HALF TO WILLIAM A. PERRY, OF WINCHESTER, MASSACHUSETTS.

AUTOMATIC FERTILIZER-DISTRIBUTER.

SPECIFICATION forming part of Letters Patent No. 441,554, dated November 25, 1890.

Application filed May 1, 1888. Serial No. 272,454. (No model.)

*To all whom it may concern:*

Be it known that I, GEORGE H. HATHAWAY, of Boston, (Charlestown,) in the county of Suffolk and State of Massachusetts, have invented certain new and useful Improvements in Automatic Fertilizer-Distributers, of which the following is a specification.

In Patent No. 291,341, granted to me January 1, 1884, I described a sand-box for street-cars, in which one side of the box was made into an oscillating gate to control the emission of sand; and my present invention relates to means whereby such a box may be adapted to a fertilizer-distributing machine.

The invention consists of mechanism for operating the gate automatically connected with the axle of the machine and adapted to be adjusted to suit varying requirements.

In the accompanying drawings, Figure 1 is a longitudinal section through the center of the machine. Fig. 2 is a rear elevation of the machine. Fig. 3 is a front elevation of the adjusting-levers and racks. Fig. 4 is a detail view of a modified form of one of the parts.

The hopper 1, adapted to contain the fertilizer, is mounted on frame 2, carried by axles 3 and wheels 4. The frame may be provided with handles 5, as shown, or with shafts for a horse, or with both, as may be desired. The axle is shown divided in the mid-length to allow the wheels to turn without sliding, and thereby to not interrupt the operation of the boxes.

The hopper is divided into two or more boxes by partitions, as at 6, and each box is provided with a gate 7, pivoted at mid-height, as at 8, and forming the rear side of the box. The gates have flanges 9 at their side edges, which move behind guards 10, and thus prevent the escape of material. I have shown but two boxes; but it is evident that any number of boxes may be used. It will be necessary, however, that each box be provided with an independent operating mechanism and an independent gate.

Chutes 11 and 12 guide the material to within a short distance of the ground and prevent it from being blown away.

The gates are operated by the rods 13 and levers 14, pivoted thereto and fulcrumed at 15. The levers 14 are worked up and down by cam-wheels 16, mounted on shafts 17, which are driven by sprocket-wheels 18 and chains 19 from the axles.

Instead of the sprocket-wheels and chains, I may use any other form of gearing for communicating motion from the axles to the cam-shafts 17.

The cam-wheels 16 may operate against anti-friction rollers 29 on the end of levers 14, or the levers may be simply bent at the ends, as shown in Fig. 4, and the cam-wheel made to operate against this bent part. The levers 14 are fulcrumed on the ends of adjusting-arms 20, pivoted at 21 to hangers 22, and provided with latch-handles 23, adapted to engage with the notches in the segments 24, so that the arms may be set at any desired position, thereby enabling the operator to raise or lower the rear end of levers 14 and in this way adjust the amount of throw of said levers. When the handles 23 are raised, the fulcrums 15 will be lowered and the front ends of the levers 14 raised so as to engage to a less extent with the cam-wheels. When the handles are raised to their highest position, the levers 14 will be entirely free of the cam-wheels, thereby throwing the boxes out of action.

Springs 25 serve to close the gates when opened by the levers.

It will be seen that the adjusting-arms form a ready and simple means of varying the stroke of the levers 14, and consequently the amount of fertilizer discharged.

A fertilizing-machine of this kind is light and easy to keep in repair. It will not clog up and may be used to handle material in a wet or soggy condition. One part of it may be adjusted to deliver more than another, if desired, and it will operate equally well going backward as going forward.

Having thus described my invention, what I claim as new is—

1. An automatic fertilizer-distributer having the hopper 1 divided into two or more sections and independent oscillating gates for each section.

2. An automatic fertilizer-distributer having a hopper with two or more sections, independent oscillating gates therefor, and mechanism for operating said gates connected with the axle of the machine, the said axle being made in two parts, substantially as and for the purpose set forth.

3. In a fertilizer-distributer, the combination of the wheels and axle with a hopper and oscillating gate, a toothed or cam wheel on the axle, or a shaft driven therefrom, and a lever connected to the said gate and operated by said toothed or cam wheel.

4. The combination, with the hopper and oscillating gate, of the lever for operating the same, said lever having an adjustment to vary its throw.

5. The combination of the hopper and oscillating gate with the lever for operating said gate and an adjustable arm to which the said lever is fulcrumed.

GEORGE H. HATHAWAY.

Witnesses:
W. H. KNIGHT,
JOHN P. S. CHURCHILL.